(12) United States Patent
Barna et al.

(10) Patent No.: US 10,743,394 B2
(45) Date of Patent: Aug. 11, 2020

(54) TWO-LAYER LIGHTING CONTROL NETWORK SYSTEMS AND METHODS

(71) Applicant: RAB Lighting Inc., Northvale, NJ (US)

(72) Inventors: Ross A. Barna, New York, NY (US); Jason Lawrence Oliver, Rye, NY (US)

(73) Assignee: RAB Lighting Inc., Northvale, NJ (US)

( * ) Notice: Subject to any disclaimer, the term of this patent is extended or adjusted under 35 U.S.C. 154(b) by 0 days.

(21) Appl. No.: 16/519,561

(22) Filed: Jul. 23, 2019

(65) Prior Publication Data

US 2020/0029411 A1    Jan. 23, 2020

Related U.S. Application Data (60) Provisional application No. 62/702,028, filed on Jul. 23, 2018.

(51) Int. Cl.
*H05B 47/19* (2020.01)
*H04W 76/15* (2018.01)
(Continued)

(52) U.S. Cl.
CPC .......... *H05B 47/19* (2020.01); *F21V 23/003* (2013.01); *H04W 76/15* (2018.02); *H04W 84/18* (2013.01)

(58) Field of Classification Search
None
See application file for complete search history.

(56) References Cited

U.S. PATENT DOCUMENTS

| 8,443,071 B2 | 5/2013 | Lu et al. |
| 8,836,476 B2 | 9/2014 | Campbell et al. |

(Continued)

FOREIGN PATENT DOCUMENTS

| CN | 203368836 | 12/2013 |
| CN | 105722284 | 6/2016 |
| CN | 106949423 | 7/2017 |

OTHER PUBLICATIONS

Lory Gil, Amazon, How to control your lights with Amazon Echo, iMore, Last updated Apr. 21, 2019, Retrieved from https://www.imore.com/how-control-your-lights-amazon-echo on Oct. 24, 2019.

(Continued)

*Primary Examiner* — Jimmy T Vu
*Assistant Examiner* — Laura Yesildag
(74) *Attorney, Agent, or Firm* — Frost Brown Todd LLC; Dennis S. Schell; Kevin C. Oschman (57) ABSTRACT

Two-layer lighting control network systems and methods are disclosed. Embodiments include client lighting devices having a first type of radio for receiving wireless control signals, a lighting controller including a second type of radio, and a hub lighting device having a second type of radio for wireless communication with the lighting controller and a first type of radio for communicating with the client lighting devices. The first wireless network includes the first type of radio of hub lighting devices and the first type of radio of client lighting devices, and the second wireless network includes the second type of radio of the lighting controller and the second type of radio of the hub lighting devices. In at least one embodiment, client lighting devices are lamps having the first type of radio. In other embodiments, hub lighting devices are light fixtures having the first and second types of radios.

20 Claims, 3 Drawing Sheets

(51) Int. Cl.
*H04W 84/18* (2009.01)
*F21V 23/00* (2015.01)

(56) References Cited

U.S. PATENT DOCUMENTS

| | | | |
|---|---|---|---|
| 8,954,170 B2 | 2/2015 | Chemel et al. |
| 9,313,864 B2 | 4/2016 | Setomoto et al. |
| 9,320,101 B2 | 4/2016 | Sun et al. |
| 9,320,121 B2 | 4/2016 | Sun et al. |
| 9,560,727 B2 | 1/2017 | Reh et al. |
| 9,572,228 B2 | 2/2017 | Henig et al. |
| 9,576,786 B2 | 2/2017 | Greenberg et al. |
| 9,596,716 B2 | 3/2017 | Deng et al. |
| 9,635,740 B2 | 4/2017 | Sun et al. |
| 9,713,235 B2 | 7/2017 | Brochu et al. |
| 9,717,132 B2 | 7/2017 | Sun et al. |
| 9,730,300 B2 | 8/2017 | Chow |
| 9,769,903 B2 | 9/2017 | Hu et al. |
| 9,820,361 B1 | 11/2017 | Turvy, Jr. et al. |
| 9,860,965 B2 | 1/2018 | Recker et al. |
| 9,883,570 B1 | 1/2018 | Turvy, Jr. et al. |
| 2015/0296599 A1 | 10/2015 | Recker et al. | |
| 2016/0085431 A1 | 3/2016 | Kim et al. | |
| 2017/0171950 A1* | 6/2017 | Barna | H05B 37/0272 |
| 2017/0245351 A1 | 8/2017 | Leinen et al. | |
| 2017/0277147 A1 | 9/2017 | De Vaan et al. | |
| 2018/0027633 A1 | 1/2018 | Roquemore, III et al. | |

OTHER PUBLICATIONS

Philips Hue, Philips Hue Bulbs and Wireless Connected Lighting System, 2018-2019, Retrieved from https://www2.meethue.com/en-in on Oct. 24, 2019.

Synthe FX, Luminair 3, 2008-2019, Retrieved from http://synthe-fx.com/products/luminair on Oct. 24, 2019.

AcuityBrands; XPoint Wireless, Fixture-Integrated Wireless Controls for Hight Performance Lighting Management; Retrieved from the Internet on Oct. 31, 2019.

Lutron, Powpak Wireless Fixture Control, Jan. 2015, Retrieved from http://www.lutron.com/TechnicalDocumentLibrary/3672527_PowPak_Wireless_Fixture_Control_Sell_Sheet.pdf on Oct. 24, 2019.

* cited by examiner

TWO-LAYER LIGHTING CONTROL NETWORK SYSTEMS AND METHODS

TECHNICAL FIELD

Embodiments of this disclosure relate generally to control systems and more particularly to wireless lighting control systems for simultaneously controlling the lighting outputs of a multitude of lighting devices.

BACKGROUND

Light fixtures are oftentimes installed in large quantities, such as by the hundreds or thousands. Upgrading such an installation to a "smart" lighting system generally requires a central lighting controller that wirelessly communicates with each of the individual light fixtures for ON/OFF and optionally dimming control and other control. Adding to each light fixture a wireless radio that can communicate with a central lighting controller, for example, a local gateway, can be costly, particularly when controlling light fixtures over a large area; therefore, a method of minimizing the per-fixture cost is needed. Lamps (e.g. light bulbs) can be replaced at a lower cost than replacing light fixtures in an existing installation, so one cost savings measure that has been introduced is to replace existing lamps with "smart lamps," which are lamps that feature wireless connectivity. However, this solution does not solve the problem of the higher per-fixture cost for wireless radios that are effective over a large area or for high complexity radios that support a mesh network for covering a larger area. Additionally, when large quantities of light fixtures are controlled simultaneously by a single central lighting controller, the high quantity of resulting wireless transmissions can cause excess latency, lost transmissions, and other obstacles to proper lighting system function.

As such, it was realized by the inventors of the current disclosure that improvements are needed to wirelessly control a multitude of light fixtures at lower costs and with reduced wireless network congestion.

SUMMARY

Embodiments of the present disclosure provide an improved two layer lighting control network. In accordance with one embodiment of the present disclosure, a two layer lighting control network can include a plurality of client lighting devices having a first type of radio for receiving wireless control signals, a lighting controller including a second type of radio, and at least one hub lighting device having a second type of radio for wireless communication with the lighting controller and a first type of radio for communicating with the plurality of client lighting devices. The lighting control network can further include a first wireless network comprising the first type of radio of one of the at least one hub lighting devices and the first type of radios of at least some of the plurality of client lighting devices, and a second wireless network comprising the second type of radio of the lighting controller and the second type of radio of the at least one hub lighting device.

In accordance with another embodiment of the present disclosure, grouping and controlling lighting devices can include the acts of joining at least some of the plurality of client lighting devices with one of the at least one hub lighting device into a first lighting device group using the first wireless network, sending a control signal for the first lighting device group from the lighting controller to the one of the at least one hub lighting device associated with the first lighting group using the second wireless network, and sending a control signal from the one of the at least one hub lighting device associated with the first lighting group to the at least some of the plurality of client lighting devices associated with the first lighting group using the first wireless network.

In accordance with still another embodiment of the present disclosure, the lighting control network can include additional features to ease installation, reduce cost of installation, and reduce wireless network congestion. For example, each of the plurality of client lighting devices can be a lamp having the first type of radio. In another example, each of the at least one hub lighting device can be a lamp having the first type of radio and the second type of radio. In another example, each of the at least one hub lighting device can be a lighting fixture (luminaire) having the first type of radio and the second type of radio. In yet another example, each of the plurality of client lighting devices can a lighting fixture (luminaire) having the first type of radio and none of the second type of radio.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and sub-combinations. All such useful, novel, and inventive combinations and sub-combinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

DETAILED DESCRIPTION OF THE ILLUSTRATED EMBODIMENTS

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Whether incorporating wireless features into lamps in an existing installation or into the light fixtures of an existing installation (lamps and light fixtures collectively or alternatively a "smart lighting device"), an improved physical architecture for the wireless communication network can improve efficiency in lighting, reduce costs, and reduce wireless network congestion. Because smart lighting devices located in the same vicinity are typically configured to mimic each other's output to achieve a particular lighting scheme, each individual smart lighting device does not need to be entirely independent from the others, but can instead be grouped together according to desired common functioning, for example, common ON/OFF, dimming, or color temperature outputs. Implementing grouped lighting controls in this manner commonly requires rewiring and connecting each device in the group, or alternatively configuring a complex and high-cost lighting system which operates using an overly-congested wireless network.

Embodiments of the present disclosure provide systems and methods which simultaneously enable lighting control adjustments to be made wirelessly to one or more lighting controllers each coupled to at least one lamp (e.g., light bulb). More particularly, the disclosed systems and methods utilize one or more smart lighting controllers ("hub" or "master" devices) to simultaneously control one or more less complex lighting controllers ("client" or "slave" devices) within a two-layer physical architecture. Advantageously, the two-layer approach limits the number of longer range and/or more complex transceivers, for example, wireless mesh radios, required for communication within the lighting control network.

Figure 1:
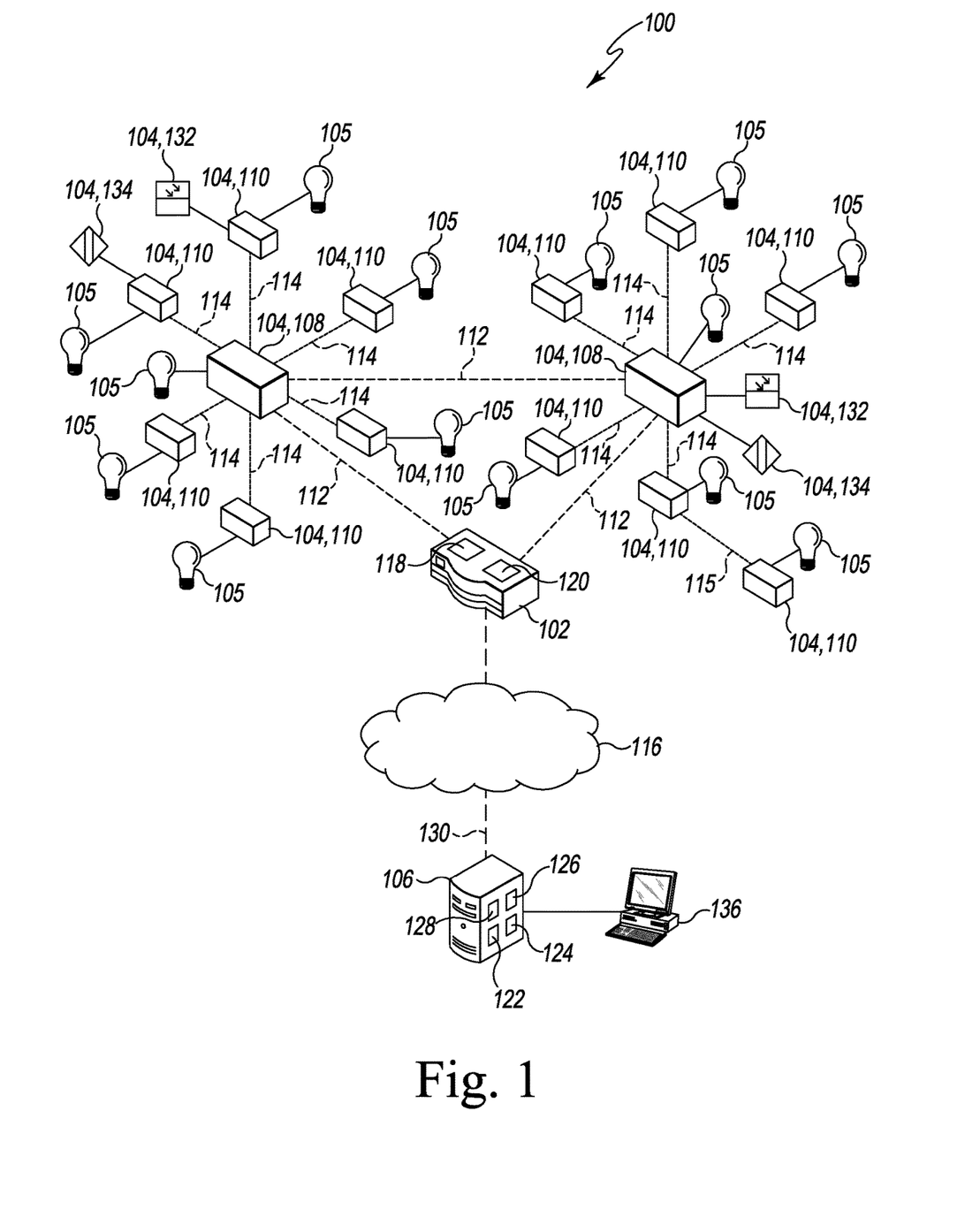
FIG. 1 illustrates an exemplary two-layer lighting control network according to embodiments of the present disclosure.

Depicted in FIG. 1 is a two-layer lighting control network 100 according to at least one embodiment of the present disclosure. The exemplary lighting control network 100 generally includes one or more site devices 104 and optionally a gateway 102 and/or a remote server 106. The gateway 102 can be in wireless communication with one or more site devices 104 and the remote server 106. As disclosed herein, site devices 104 can refer to at least hub devices 108, client devices 110, daylight harvesters 132, and occupancy sensors 134. Hub devices 108 and client devices 110 each may function as a lighting controller for managing the lighting output of one or more connected lamps 105 (e.g., LEDs or incandescent bulbs). In one embodiment, the network 100 includes a first network layer 112 which facilitates communications between the gateway 102 and hub devices 108 and a second network layer 114 which facilitates communications between the hub devices 108 and the client devices 110. In some embodiments, the second network layer 114 can also facilitate communications between client devices 110 and other client devices 110 using a client-to-client connection 115. In other embodiments, the first network layer 112 can facilitate communications directly between the remote server 106 and the hub devices 108 using the WAN 116, bypassing the need to include a gateway 102 at the site.

The gateway 102 may include one or more communications modules 118 capable of wirelessly communicating with the hub devices 108 within first network layer 112, with client devices 110 within the second network layer 114, and/or also with the server 106 using a wide-area network (WAN) 116. More specifically, gateway 102 facilitates wireless data transfer between the site devices 104 and/or the server 106. The gateway 102 may include a processing module 120 for processing and/or communicating instructions (e.g., to site devices 104) received from the server 106 or other source such as user input, or for receiving and/or processing information received from the site devices 104. That is, the gateway 102 may run applications locally while also interfacing across a WAN 116, e.g., an internet or cellular connection, for connectivity to the server 106. An exemplary gateway device may be, for example, the XBee® Zigbee® Gateway provided by Digi® International, Inc.

The first network layer 112 can be, for example, a local wireless mesh network wherein the gateway 102 can two-way communicate with the hub devices 108. Hub devices 108 may also optionally communicate with other hub devices 108, for example, to extend the range of the first network layer 112 by using hub devices 108 as wireless network repeaters, such as in a mesh network. In other embodiments, the first network layer 112 can instead utilize, but is not limited to, broad spectrum radio, microwave radio, cellular, WiFi, or Bluetooth communications.

In some embodiments, the second network layer 114 can use, for example, point-to-point radios to broadcast lighting commands from hub devices 108 to client devices 110. Therefore, a hub device 108 can control individual client devices 110, a large grouping of client devices 110, or other site devices 104 all at once without congesting the wireless network with multiple devices sending multiple signals concurrently. In embodiments wherein one or more client devices 110 include a transceiver, client devices 110 may be capable of transmitting or forwarding lighting commands to other client devices 110 using a client-to-client connection 115. The hub devices 108 could also use the second network layer 114 to broadcast to site devices 104 through other wireless communication means such as, for example, broad spectrum radio, Zigbee, microwave radio, WiFi, or Bluetooth. As illustrated by FIG. 1, the second network layer 114 can resemble a "hub and spoke" architecture, wherein the hub devices 108 are each positioned near a grouping of connected client devices 110 and the hub 108 is configured to broadcast lighting control signals using the second network layer 114 to those client devices 110. In at least one embodiment, lighting control signals broadcast within the second network layer 114 can be low-frequency radio signals which commonly exhibit better penetration properties, for example, for passing through objects such as walls with less attenuation.

The server 106 may include particular computer and networking components to enable the functions described herein, such as a processor, memory, storage, display, network interface, and input/output device, for example. The processor 122, or processors, may execute unique sets of instructions which may be implemented as computer readable program code and stored in memory or storage such that the server 106 is configured as a special purpose system. Hardware, software, and particular sets of instructions may transform the server 106, or portions thereof, into a lighting control server, as described herein. More particularly, the server 106 includes a combination of computer hardware and software which facilitates communication to the site devices 104 of the illumination control system 100 and performance of the functions described herein, for example, a communications module 124 configured to provide a data connection 130 with the WAN 116, a networking module 126, and/or a memory module 128. The communications module 124 can be configured to transmit or request data from gateways 102 or site devices 104 on a repetitive basis, e.g., about ten times per second.

The server 106 may also include a computing device 136, for example, a personal computer, laptop computer, netbook computer, tablet device, mobile device, portable electronic device (PED), smart device, or cell phone configured to communicate with the system 100 through the server 106 using the WAN 116 or another communication network or connection. The computing device allows a user to configure, monitor, and/or control the gateway 102 and/or site devices 104 of the system 100.

As also should be appreciated by those skilled in the art, the exemplary illumination control system 100 can include more than one server 106, wherein each server 106 may function independently or function as a repeater to extend the broadcast range of another server 106.

Additional exemplary site devices 104 are a daylight harvester 132 and an occupancy sensor 134. The system 100 can optionally be configured to dim or switch lighting devices 105 in response to environmental light level as measured by the daylight harvester 132. The occupancy sensor 134 could also include similar modules and functionality as the daylight harvester 132. To conserve power, the daylight harvester 132 and occupancy sensor 134 can each provide single-direction information to the gateway 102 or any site device 104.

Figure 2:
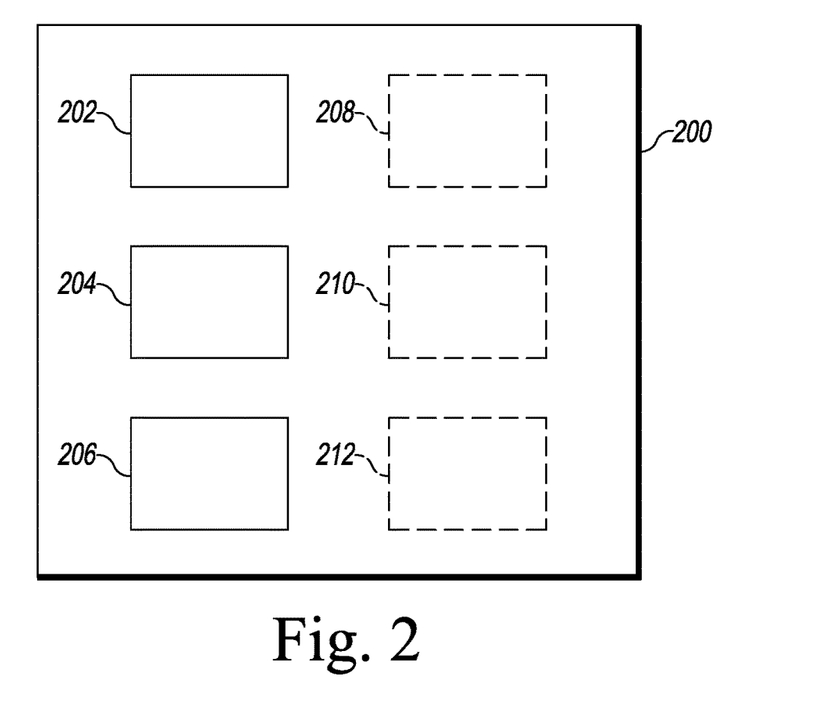
FIG. 2 illustrates an exemplary hub device, according to the present disclosure.

Depicted in FIG. 2 is a hub 200, which is an example of hub device 108, according to the present disclosure. The hub 200 includes a processor 202, a first radio 204, and a second radio 206, and can optionally include a user interface 208, daylight harvester 210, and/or an occupancy sensor 212. Hub 200 uses the processor 202 along with the first radio 204 to receive lighting control signals from a local lighting controller such as the gateway, and the processor 202 along with the second radio 206 to broadcast lighting control signals to one or more clients 110.

The first radio 204 can be a transceiver, for example, a Zigbee mesh network transceiver which is capable of networking with other hubs and gateways within the local wireless system, as described. The second radio 206 can be a transmitter which is capable of one-way broadcasting signals greater distances with fewer obstructions, although other devices can be used as appreciated by one skilled in the art. In one embodiment, the second radio 206 can be a less-complex and optionally a transmit-only radio, for example, a point-to-point or broadcast radio transmitter, which can be used in the second network layer for communication from the hub to clients 100. In another embodiment, using a low-frequency, one-way communicating second radio 206 in each hub 108 results in a reduced number of expensive radios required to be provided with each hub 108 and each client 110 which results in significant cost savings. Additionally, a low-frequency radio does not require large bandwidth for normal operation, thereby greatly reducing radio transmission congestion when many lighting devices are utilized within the networked lighting system.

Hub 200 may also contain solid state data storage (e.g., memory). Solid state data storage can be used by hubs to store data representative of a lighting output to provide upon the hub smart lighting device first powering on or upon loss of communications with the lighting system.

The control signals sent by the hub 200 to the clients 110 in its group can include ON/OFF, dimming, and color-temperature output commands, and clients can be capable of receiving the commands and changing the lighting outputs of connected lamps accordingly. To ensure local area lighting remains constant across multiple hubs and clients, the hub 200 can continuously or intermittently broadcast the lighting commands at close intervals (e.g., multiple times per second).

In an alternative embodiment, the second radio 206 can be a more complex transceiver capable of sending and receiving signals from the site devices, for example, clients, daylight harvesters, or occupancy sensors for more advanced lighting control capabilities provided by those site devices.

Figure 3:
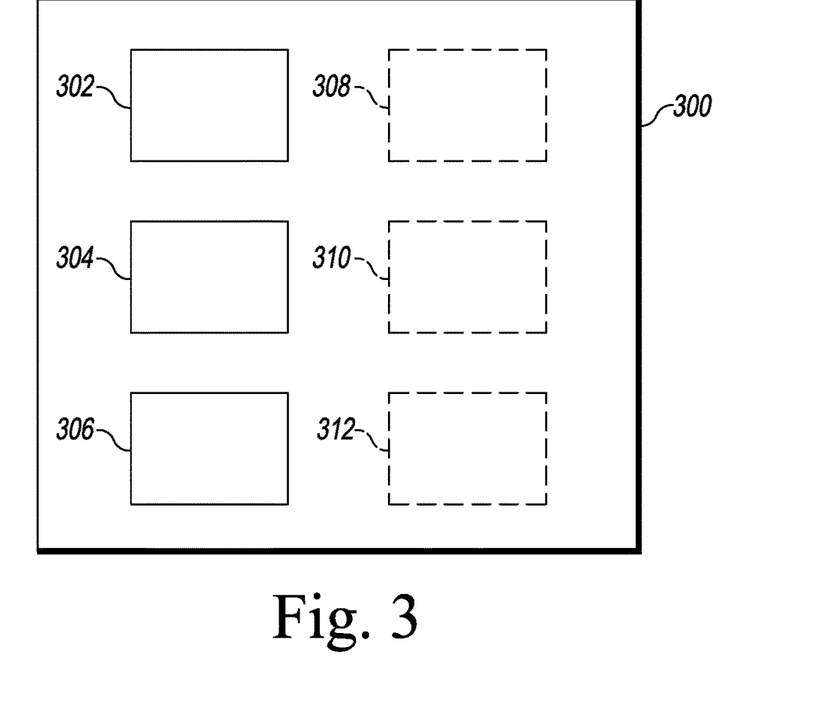
FIG. 3 illustrates an exemplary client device, according to the present disclosure.

Depicted in FIG. 3 is a client 300, which is an example of client device 110, according to the present disclosure. The client 300 includes a processor 302 and a radio 304, and can optionally include a user interface 308, daylight harvester 310, an occupancy sensor 312, and/or a memory module 306. The client 300 uses the processor 302 and radio 304 to receive communications from a hub and change the lighting output to the one or more connected lamps.

The radio 304 can be a simple receiver which is capable of detecting signals broadcasted from hubs. The radio 304 can actively listen for a broadcast immediately upon the client powering on, for example, as part of its start-up routine. Active listening can consist of enabling a radio module and permitting a receiver to scan for signals broadcast over a particular frequency range. By doing so, this allows a large number of clients 200 to follow the same lighting patterns, even if powered on and off, power is temporarily lost, or communication with the hub is temporarily lost.

Optionally, radio 304 and radio 204 can be transceivers capable of two-way communications, such as for power monitoring purposes or to report reception of commands or other changes in lighting state, or to retransmit a control signal to another nearby smart lighting device. Client 300 may also contain solid state data storage 306 (e.g., memory). Solid state data storage 306 can be used by clients 300 to store data representative of a lighting output to provide upon the client lighting device first powering on or upon loss of communications with the lighting system.

Unlike hubs 200, clients 300 can contain minimal processing logic and a single low-cost radio, which may be a receiver-only radio. Each client 300 is able to receive lighting control commands from a hub 200 and adjust its individual lighting output accordingly. However, secondary control (such as by a user or sensor) may be capable of overriding the control signals sent by a hub device.

In some variations, the hub 200 and the client 300 each may optionally include one or more sensors. For example, a daylight harvester 210, 310 can be included in either device. The daylight harvester 210, 310 can be operated using open-loop control wherein it reacts to different sunlight levels, e.g., in a first mode the lights are illuminated and extinguished when the light sensor detects ambient light above/below a predetermined level. In another open-loop control mode, multiple thresholds are set and the lights are illuminated, dimmed, and extinguished depending on the ambient light sensed relative to the various thresholds. The daylight harvester 210, 310 can also be used to detect environmental color temperature levels in real-time and communicate the levels to one or more of the other clients, hubs, gateways, and servers. The server may use signals detected by daylight harvesters affiliated with site devices to determine and broadcast lighting control commands back to the gateway and local site devices.

Further, the hub 200 the client 300 each may optionally include or be associated with a sensor to detect occupancy, such as occupancy sensor 212, 312, and send a signal to one or more other hubs 200 and clients 300 (which may not have occupancy sensors) to turn on. As another example, one or more of a hub 200 and client 300 may include or be associated with one or more occupancy sensors 212, 312 to detect occupancy and alone turn on or change to full brightness, or to send a signal to one or more other hubs 200 or clients 300 to activate all lamps in a particular local site. In either example, hubs 200 and clients 300 can optionally communicate the sensor and/or lamp status of hub devices 200 and client devices 300 using the local or larger wireless network. In these ways, one occupancy sensor 212, 312 can be used to control an individual light fixture or a group of light fixtures.

Still further, the hub 200 and the client 300 each may optionally include a user interface device 208, 308 including, for example, a touchscreen control device, such as a smartphone or tablet computing device, having a user interface application or software installed directly thereon, interfacing with the server for configuring, monitoring and/or controlling the lighting control system. User interface devices 208, 308 can be used to develop or program a particular lighting pattern or to assist with commissioning the system.

Figure 4:
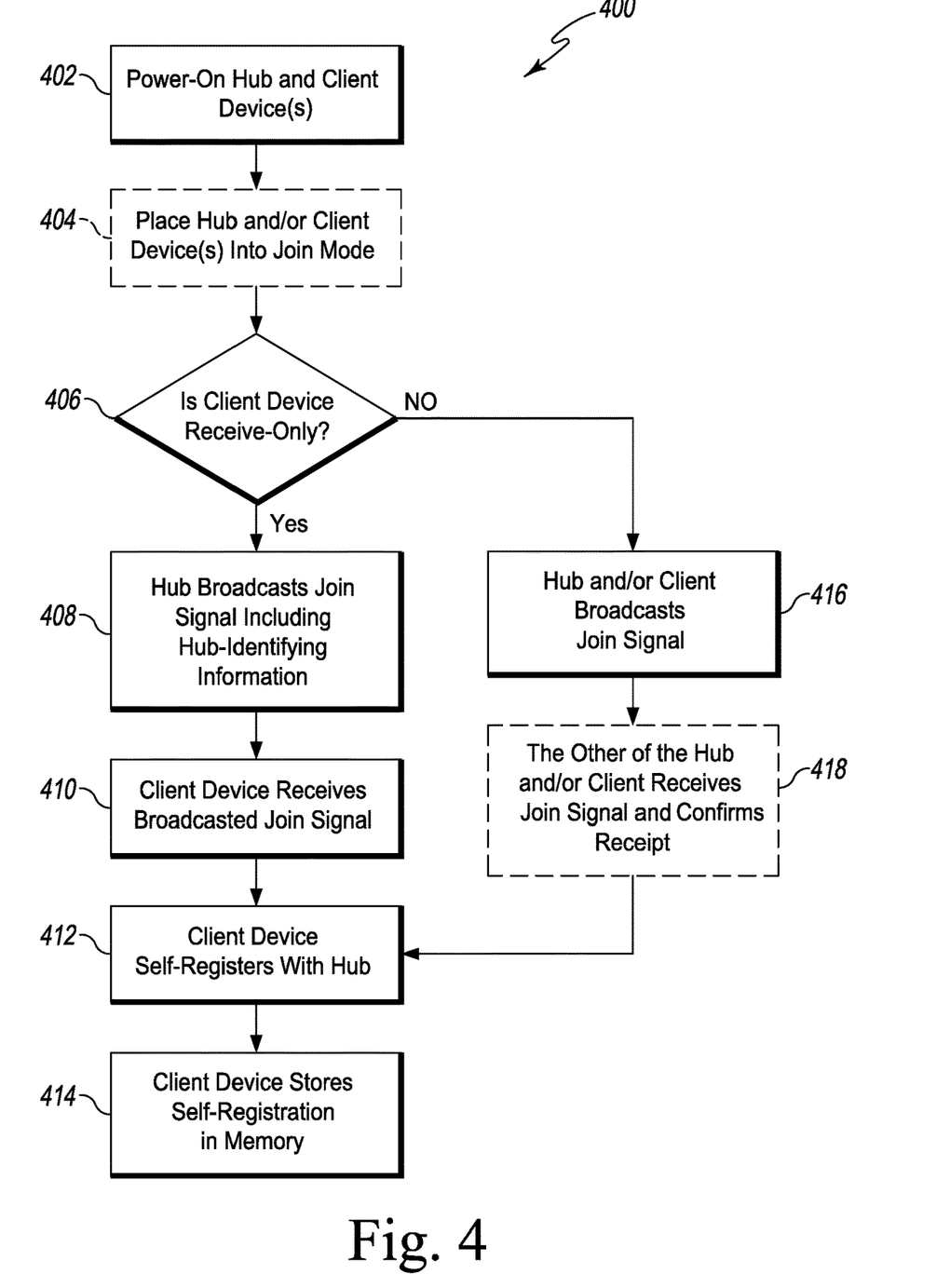
FIG. 4 is a flowchart representing an exemplary method of commissioning the two-layer lighting control system of the present disclosure.

Also disclosed herein is a more efficient method to commission wireless lighting control networks, particularly methods to group clients with a particular hub that each client should adjust its lighting output to mimic. Depicted in FIG. 4 is a flowchart representing one method of commissioning the two-layer lighting control system of the present disclosure.

First, at step 402, a hub and a client to be joined must be powered on. Optionally, at step 404, the hub and/or client can be placed into join mode to facilitate the joining process. Either device can be placed into join mode, for example, upon first powering on or by activating the device using a user interface located on or coupled to the device, gateway, or using software on a user interface in direct communication with the device. Alternatively, either device could be placed into join mode by a user using the remote server or using software on a user interface in direct communication with the server, provided that the client includes a transceiver for two-way communications. Alternatively, one or both of the hub and client can be automatically placed into join mode upon initial power-up. A hub, if in join mode and within communication range to the client, can register a client as part of its group in one of two ways. At step 406, if the client utilizes receive-only radios to communicate with a hub over the second network layer, then the process will continue at step 408 wherein the hub in join mode will broadcast a join control signal including identifying information for that hub. At step 410, the clients in communication range and in join mode will receive the broadcasted signal. At step 412, upon receiving the join control signal, the client will register itself to only receive and react to control signals from the particular hub which broadcasted the join signal. Finally, at step 414, the client can store the association with the hub device in its onboard memory to ensure it remains capable of detecting future broadcasts, for example, lighting control signals. At step 406, if the clients use transceivers to communicate with a hub over the second wireless network, then the process can proceed to step 416 wherein the hub automatically detects and connects with each client. At this step, joining can be supported despite whether the hub or client initiates joining with a control signal. Optionally, at step 418, the device receiving the join signal may report receipt to the device broadcasting the join signal, or it may report its registration to the gateway and remote server. At this step, the hub may report to the gateway and/or the remote server each client it has connected with and joined into its group. As with before the process can conclude with the client storing the registration in its onboard memory.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

Reference systems that may be used herein can refer generally to various directions (e.g., upper, lower, forward and rearward), which are merely offered to assist the reader in understanding the various embodiments of the disclosure and are not to be interpreted as limiting.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

What is claimed is:

1. A lighting system, comprising:
a plurality of client lighting devices positioned at a site and having a first radio, wherein the first radio is configured to communicate using a first wireless network, wherein the first wireless network includes one-way data transmission;
a wireless gateway positioned at the site and having a second radio, wherein the second radio is configured to communicate using a second wireless network, wherein the second wireless network includes two-way data transmission;
at least one hub lighting device positioned at the site and having a third radio configured to communicate with the wireless gateway using the second wireless network, and having a fourth radio configured to communicate with at least one of the plurality of client lighting devices using the first wireless network;
wherein at least one of the plurality of client lighting devices is configured to join with one of the at least one hub lighting device using the first wireless network to form a first lighting device group;
wherein the wireless gateway is configured to transmit a first lighting control signal using the second wireless network for controlling the first lighting device group to the one of the at least one hub lighting device associated with the first lighting device group;
wherein the at least one hub lighting device of the first lighting device group is configured to receive the first lighting control signal from the wireless gateway using the second wireless network and transmit the first lighting control signal using the first wireless network to the at least one of the plurality of client lighting devices associated with the first lighting device group; and
wherein the at least one of the plurality of client lighting devices of the first lighting device group is configured to receive the first lighting control signal and adjust a first lighting output.

2. The lighting system of claim 1, wherein each of the plurality of client lighting devices is a lamp, wherein the first radio is a receiver configured to communicate using the first wireless network.

3. The lighting system of claim 1, wherein each of the plurality of client lighting devices is a luminaire, wherein the first radio is a receiver configured to communicate using the first wireless network.

4. The lighting system of claim 1, wherein each of the at least one hub lighting device is a lamp, wherein the third radio is a transmitter configured to communicate using the first wireless network and the fourth radio is a transceiver configured to communicate using the second wireless network.

5. The lighting system of claim 1, wherein each of the at least one hub lighting device is a luminaire, wherein the third radio is a transmitter configured to communicate using the first wireless network and the fourth radio is a transceiver configured to communicate using the second wireless network.

6. The lighting system of claim 1, wherein the first wireless network includes low-frequency radio signals.

7. The lighting system of claim 1, wherein the second wireless network includes a Zigbee mesh network.

8. The lighting system of claim 1, wherein each one of the plurality of client lighting devices of the first lighting device group receives the first lighting control signal from one of that at least one hub lighting device and adjusts its lighting output.

9. The lighting system of claim 1, wherein the at least one hub lighting device of the first lighting device group is configured to transmit the first lighting control signal to the plurality of client lighting devices of the first lighting device group using the first wireless network at a rate of multiple times per second.

10. The lighting system of claim 1, wherein at least one of the plurality of client lighting devices is configured to join with one of the at least one hub lighting device using the first wireless network to form a second lighting device group;
wherein the wireless gateway is configured to transmit a second lighting control signal using the second wireless network for controlling the second lighting device group to the one of the at least one hub lighting device of the second lighting device group;
wherein the at least one hub lighting device of the second lighting device group is configured to transmit the second lighting control signal using the first wireless network to the at least one of the plurality of client lighting devices of the second lighting device group; and
wherein the at least one of the plurality of client lighting devices of the second lighting device group is configured to receive the second lighting control signal and adjust a second lighting output.

11. The lighting system of claim 10, wherein the first lighting output and the second lighting output produce different lighting effects.

12. A method of controlling a lighting system, the method comprising:
powering on a first hub lighting device at a site, wherein the first hub lighting device includes one of a first type of radio and one of a second type of radio, wherein the first type of radio provides for unidirectional wireless data transmission using a first wireless network, wherein the second type of radio provides for bidirectional wireless data transmission using a second wireless network;
powering on a plurality of client lighting devices at the site, wherein each of the plurality of client lighting devices includes one of the first type of radio;
joining at least some of a plurality of client lighting devices with the first hub lighting device into a first lighting device group using the first wireless network;
sending a first lighting control signal for the first lighting device group from a wireless gateway positioned at the site to the first hub lighting device using the second wireless network; and
sending the first lighting control signal from the first hub lighting device of the first lighting device group to the plurality of client lighting devices of the first lighting device group using the first wireless network.

13. The method of claim 12, comprising:
prior to powering on the plurality of client lighting devices, configuring the first hub lighting device into a join mode for forming the first lighting device group.

14. The method of claim 12, comprising:
registering at least one of the plurality of client lighting devices with the first hub lighting device upon joining the client lighting device with the first hub lighting device into the first lighting device group.

15. The method of claim 12, comprising:
storing registration data of the first hub lighting device into a memory onboard the at least one of the plurality of client lighting devices, wherein the at least one of the plurality of client lighting devices only receives data transmissions from the first hub lighting device of the first lighting device group upon storing the registration data.

16. The method of claim 12, comprising:
joining at least some of a plurality of client lighting devices with a second hub lighting device into a second lighting device group using the first wireless network;
sending a second lighting control signal for the second lighting device group from the wireless gateway to the second hub lighting device using the second wireless network; and
sending a second control signal from the second hub lighting device of the second lighting device group to the plurality of client lighting devices of the second lighting device group using the first wireless network.

17. A lighting system for grouping and controlling lighting devices, comprising:
a plurality of client lighting devices positioned at a site and having one of a first type of radio for receiving wireless control signals;
a gateway positioned at the site and including one of a second type of radio;
at least one hub lighting device positioned at the site and having one of the second type of radio for wireless communication with the wireless gateway and one of the first type of radio for communicating with the plurality of client lighting devices;
a first wireless network including the first type of radio of one of the at least one hub lighting devices and the first type of radios of at least some of the plurality of client lighting devices; and
a second wireless network including the second type of radio of the wireless gateway and the second type of radio of the at least one hub lighting device;
wherein the first type of radio provides for unidirectional wireless data transmission using the first wireless network, wherein the second type of radio provides for bidirectional wireless data transmission using the second wireless network; and
wherein grouping and controlling lighting devices includes:
joining at least some of the plurality of client lighting devices with one of the at least one hub lighting device into a lighting device group using the first wireless network,
sending a lighting control signal for the lighting device group from the wireless gateway to the one of the at least one hub lighting device of the lighting device group using the second wireless network, and
transferring the lighting control signal from the one of the at least one hub lighting device of the lighting device group to the at least some of the plurality of client lighting devices of the lighting device group using the first wireless network.

18. The lighting system of claim 17, wherein the first wireless network includes low-frequency radio signals.

19. The lighting system of claim 17, wherein each one of the plurality of client lighting devices of the lighting device group receives the lighting control signal from the wireless gateway and adjusts a lighting output.

20. The lighting system of claim 17, wherein the at least one hub lighting device of the lighting device group is configured to transmit the lighting control signal using the first wireless network at a rate of multiple times per second.

\* \* \* \* \*